(12) United States Patent
Sawyers-Abbott et al.

(10) Patent No.: US 10,605,197 B2
(45) Date of Patent: Mar. 31, 2020

(54) GAS TURBINE ENGINE AND THRUST REVERSER ASSEMBLY THEREFORE

(71) Applicant: United Technologies Corporation, Farmington, CT (US)

(72) Inventors: Nigel David Sawyers-Abbott, South Glastonbury, CT (US); James Power, Vienna, VA (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 709 days.

(21) Appl. No.: 14/955,919

(22) Filed: Dec. 1, 2015

(65) Prior Publication Data

US 2016/0153399 A1    Jun. 2, 2016

Related U.S. Application Data

(60) Provisional application No. 62/086,439, filed on Dec. 2, 2014.

(51) Int. Cl.
*F02K 1/72* (2006.01)

(52) U.S. Cl.
CPC ............. *F02K 1/72* (2013.01); *Y02T 50/672* (2013.01)

(58) Field of Classification Search
CPC .................................. F02K 1/72; F02K 1/625
See application file for complete search history.

(56) References Cited

U.S. PATENT DOCUMENTS

| | | | | |
|---|---|---|---|---|
| 3,503,211 A | * | 3/1970 | Holman | F02K 1/72 239/265.29 |
| 2009/0321561 A1 | * | 12/2009 | Andre | F02K 1/72 244/110 B |
| 2013/0284822 A1 | | 10/2013 | Howarth et al. | |
| 2014/0131480 A1 | | 5/2014 | Hurlin et al. | |

FOREIGN PATENT DOCUMENTS

| | | |
|---|---|---|
| EP | 1843031 A1 | 10/2007 |
| WO | 2012010774 A2 | 1/2012 |

OTHER PUBLICATIONS

English Abstract for WO2012010774A2—Jan. 26, 2012; 2 pgs.
European Search Report for Application No. 15197622.2-1607; dated Apr. 20, 2016; 6 pgs.

* cited by examiner

*Primary Examiner* — Andrew H Nguyen
(74) *Attorney, Agent, or Firm* — Cantor Colburn LLP

(57) ABSTRACT

The present disclosure relates generally to a thrust reverser for a gas turbine engine. As a translating cowl is translated aft from the nacelle of the gas turbine engine, a cascade is also translated in the aft direction and a blocker door coupled to the cascade is pivoted into a fan duct, thereby diverting air in the fan duct through the cascade. In the stowed position, both the cascade and the blocker door are disposed radially outward of a radially inner wall of the nacelle and/or the translating cowl.

20 Claims, 6 Drawing Sheets

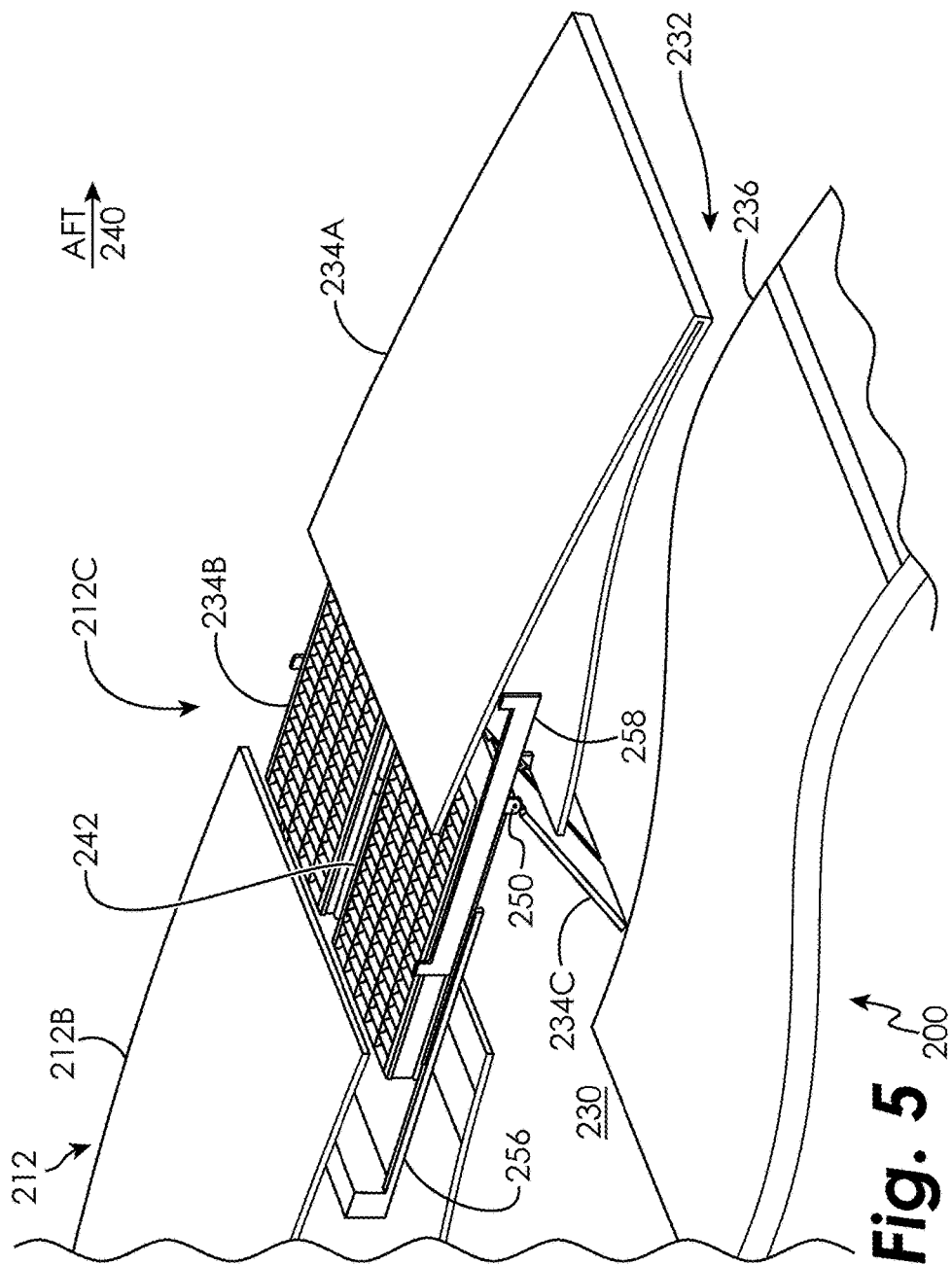

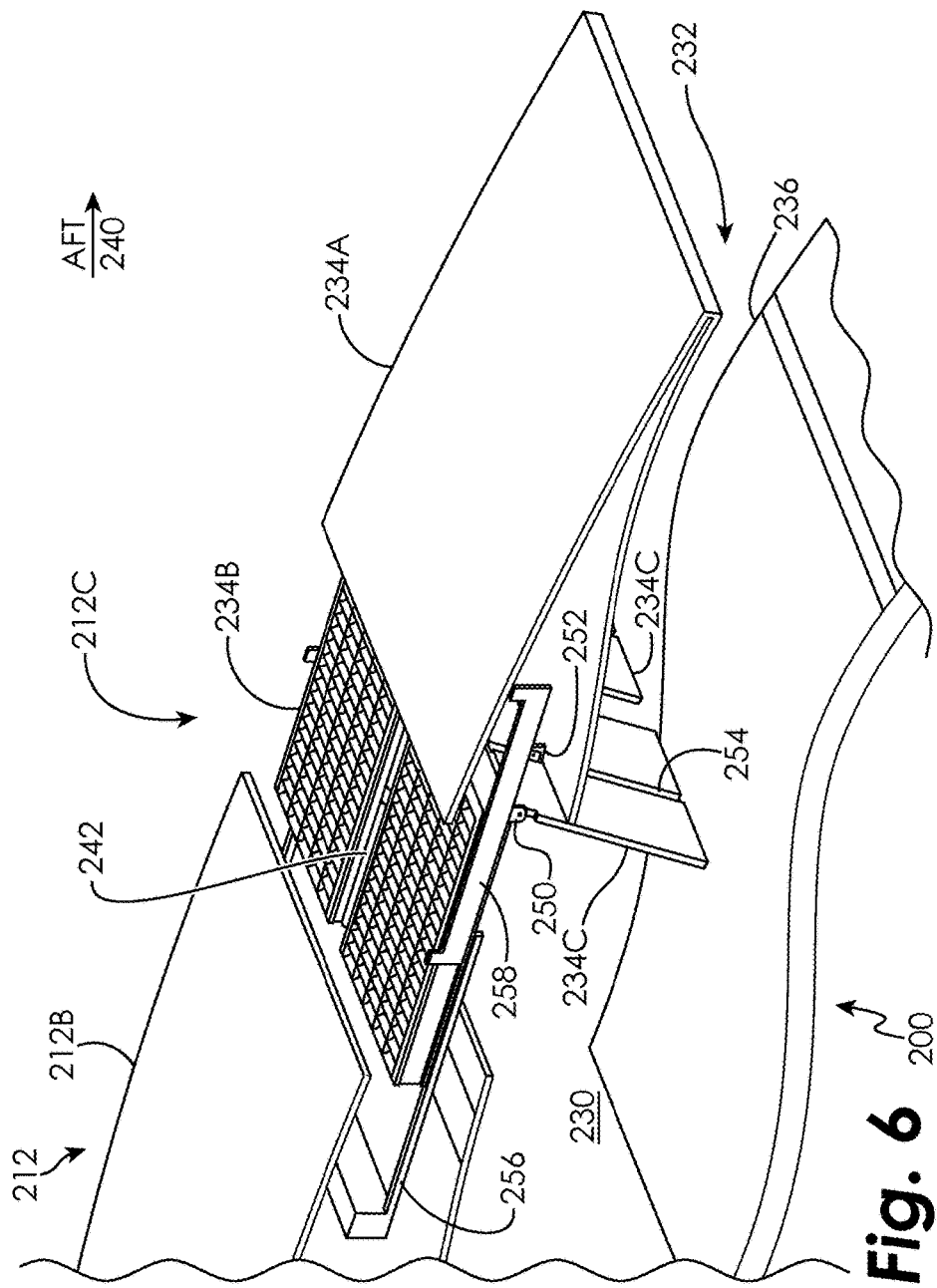

GAS TURBINE ENGINE AND THRUST REVERSER ASSEMBLY THEREFORE

CROSS REFERENCE TO RELATED APPLICATIONS

This application claims the benefit of U.S. Provisional Patent Application U.S. Ser. No. 62/086,439, filed on Dec. 2, 2014, the entire contents of which are incorporated herein by reference thereto.

TECHNICAL FIELD OF THE DISCLOSURE

The present disclosure is generally related to gas turbine engines and, more specifically, to a thrust reverser assembly for a gas turbine engine.

BACKGROUND OF THE DISCLOSURE

In a conventional thrust reverser design used in a high bypass turbofan engine, the cascade is covered by stowed blocker doors when the thrust reverser assembly is not in use, that is, during normal in-flight operation of the engine. A drawback of this type of conventional construction is that the blocker doors and link arms associated with the blocker doors can increase aerodynamic drag and reduce aerodynamic performance. Improvements in such thrust reverser assemblies are therefore desirable.

SUMMARY OF THE DISCLOSURE

In one embodiment, a thrust reverser assembly for a gas turbine engine having a core engine is disclosed, the thrust reverser assembly comprising: a nacelle surrounding the core engine and defining a bypass duct between the nacelle and the core engine, the nacelle comprising a translating cowl adapted to translate in an aft direction; a slider assembly operatively coupled to the translating cowl; a translating structure within the nacelle and/or the translating cowl and adapted to translate in the aft direction, the translating structure comprising at least one opening that is exposed to the bypass duct when the translating cowl is translated in the aft direction; and a blocker door pivotally coupled to the translating structure, the blocker door comprising a slider track engaging the slider assembly.

In a further embodiment of the above, the translating cowl comprises a radially inner wall that defines a radially outer flow surface of the bypass duct.

In a further embodiment of any of the above, an actuator is operatively coupled to the nacelle and to the translating cowl; wherein the actuator is adapted to translate the translating cowl in the aft direction.

In a further embodiment of any of the above, the slider assembly is adapted to slide in the slider track in the aft direction as the translating cowl moves in the aft direction, and interaction between the slider assembly and the slider track causes the blocker door to move from a stowed position to a deployed position by pivoting relative to the translating structure; the inner wall of the translating cowl is between the blocker door and the bypass duct when the blocker door is in the stowed position; and the blocker door projects into the bypass duct and diverts bypass air within the bypass duct through the at least one opening of the translating structure when the blocker door is in the deployed position.

In a further embodiment of any of the above, the translating cowl is adapted to translate a first distance in the aft direction; the actuator is adapted to translate the first distance in the aft direction; the translating structure is adapted to translate a second distance in the aft direction; and the first distance is greater than the second distance.

In a further embodiment of any of the above, a portion of the slider assembly is captive within the slider track.

In a further embodiment of any of the above, the slider assembly pivots with respect to the translating cowl.

In a further embodiment of any of the above, a fixed frame is coupled to the nacelle, the frame including at least one stop; a sliding frame coupled to the translating cowl and adapted to slide relative to the fixed frame; wherein the translating cascade and blocker door are disposed in sliding engagement with the frame and the sliding frame; wherein aft movement of the translating cowl causes aft movement of the translating cascade and blocker door, without movement of the slider assembly relative to the slider track, until the translating cascade engages the at least one stop; and wherein aft movement of the translating cowl after the translating cascade engages the at least one stop causes movement of the slider assembly relative to the slider track.

In a further embodiment of any of the above, the actuator comprises a mechanical actuator.

In another embodiment, a high-bypass gas turbofan engine having a core engine and a thrust reverser assembly is disclosed, the thrust reverser assembly comprising: a nacelle surrounding the core engine and defining a bypass duct between the nacelle and the core engine, the nacelle comprising a translating cowl adapted to translate in an aft direction; a slider assembly operatively coupled to the translating cowl; a translating structure within the nacelle and/or the translating cowl and adapted to translate in the aft direction, the translating structure comprising at least one opening that is exposed to the bypass duct when the translating cowl is translated in the aft direction; and a blocker door pivotally coupled to the translating structure, the blocker door comprising a slider track engaging the slider assembly.

In a further embodiment of any of the above, the translating cowl comprises a radially inner wall that defines a radially outer flow surface of the bypass duct.

In a further embodiment of any of the above, an actuator operatively coupled to the nacelle and to the translating cowl; wherein the actuator is adapted to translate the translating cowl in the aft direction.

In a further embodiment of any of the above, the slider assembly is adapted to slide in the slider track in the aft direction as the translating cowl moves in the aft direction, and interaction between the slider assembly and the slider track causes the blocker door to move from a stowed position to a deployed position by pivoting relative to the translating structure; the inner wall of the translating cowl is between the blocker door and the bypass duct when the blocker door is in the stowed position; and the blocker door projects into the bypass duct and diverts bypass air within the bypass duct through the at least one opening of the translating structure when the blocker door is in the deployed position.

In a further embodiment of any of the above, the translating cowl is adapted to translate a first distance in the aft direction; the actuator is adapted to translate the first distance in the aft direction; the translating structure is adapted to translate a second distance in the aft direction; and the first distance is greater than the second distance.

In a further embodiment of any of the above, a portion of the slider assembly is captive within the slider track.

In a further embodiment of any of the above, the slider assembly pivots with respect to the translating cowl.

In a further embodiment of any of the above, a fixed frame coupled to the nacelle, the frame including at least one stop; a sliding frame coupled to the translating cowl and adapted to slide relative to the fixed frame; wherein the translating cascade and blocker door are disposed in sliding engagement with the frame and the sliding frame; wherein aft movement of the translating cowl causes aft movement of the translating cascade and blocker door, without movement of the slider assembly relative to the slider track, until the translating cascade engages the at least one stop; and wherein aft movement of the translating cowl after the translating cascade engages the at least one stop causes movement of the slider assembly relative to the slider track.

In a further embodiment of any of the above, the actuator comprises a mechanical actuator.

In another embodiment, a method of reversing thrust of a gas turbine engine having a core engine, a nacelle surrounding the core engine, the nacelle comprising a translating cowl adapted to translate in an aft direction, a bypass duct defined by and between the nacelle and the core engine is disclosed, the method comprising: translating the translating cowl in the aft direction; translating the translating structure in the aft direction; exposing the translating structure and at least one opening thereof to the bypass duct as the translating cowl and the translating structure are translated in the aft direction; and deploying the blocker door from a stowed position to a deployed position as the translating cowl is translated in the aft direction, the blocker door including a slider track coupled to the translating cowl, the blocker door being deployed as a result of interaction between the translating cowl and the slider track; wherein the deploying step causes the blocker door to project into the bypass duct and divert bypass air within the bypass duct through the at least one opening.

In a further embodiment of any of the above, the translating cowl is translated in the aft direction a first distance, the translating structure is translated in the aft direction a second distance, and the first distance is greater than the second distance.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein:

FIG. 5 is a schematic perspective view of a gas turbine engine with thrust reverser in an embodiment.

FIG. 6 is a schematic perspective view of a gas turbine engine with thrust reverser in an embodiment.

DETAILED DESCRIPTION OF THE DISCLOSED EMBODIMENTS

For the purposes of promoting an understanding of the principles of the disclosure, reference will now be made to certain embodiments and specific language will be used to describe the same. It will nevertheless be understood that no limitation of the scope of the disclosure is thereby intended, and alterations and modifications in the illustrated device, and further applications of the principles of the disclosure as illustrated therein are herein contemplated as would normally occur to one skilled in the art to which the disclosure relates.

Figure 1:
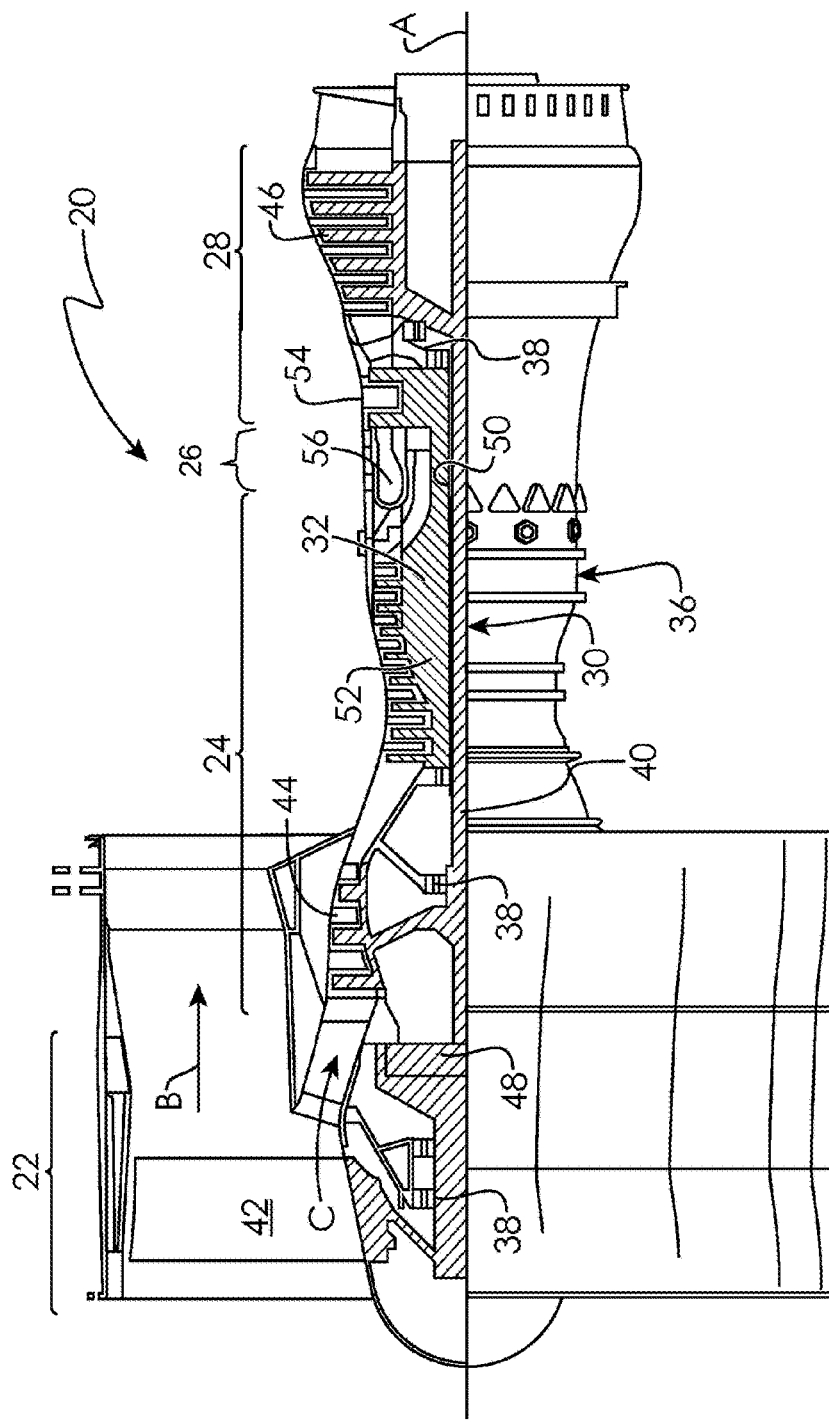
FIG. 1 is a schematic partial cross-sectional view of a gas turbine engine in an embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 m/sec).

Figure 2:
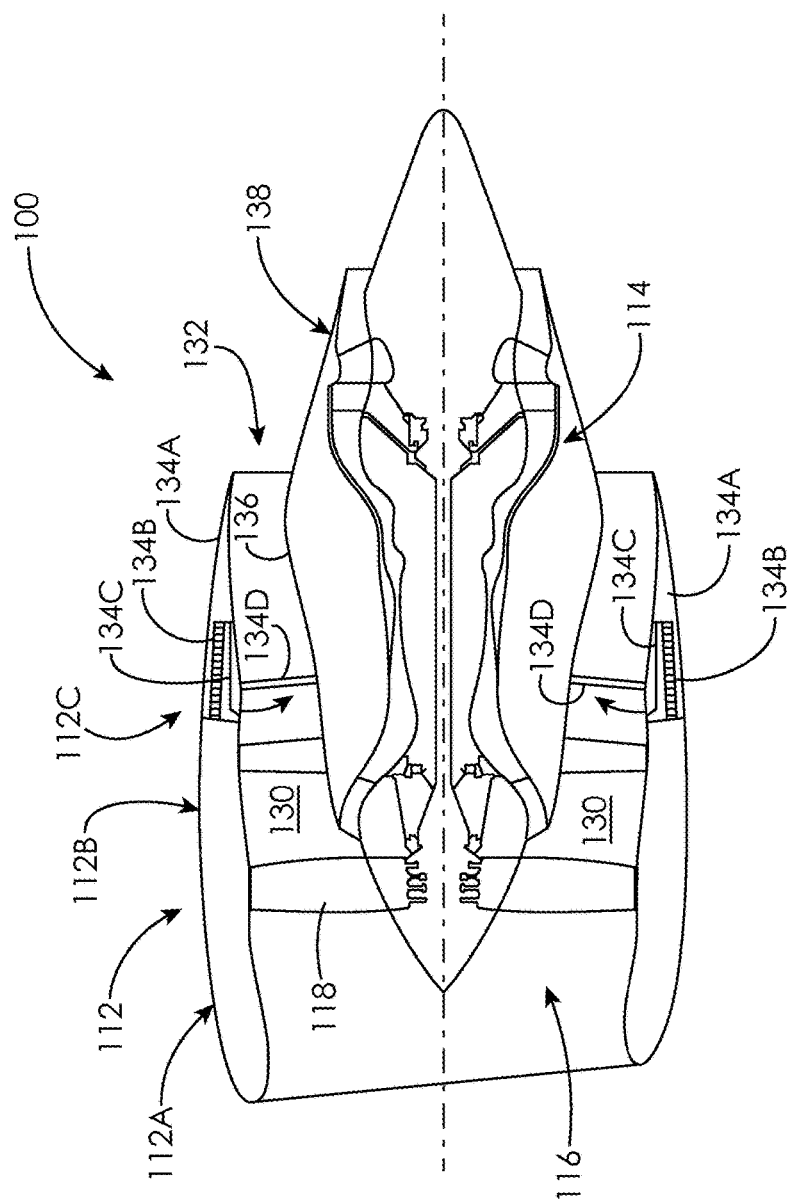
FIG. 2 is a schematic cross-sectional view of a gas turbine engine with thrust reverser in an embodiment.

FIG. 2 schematically represents a high bypass turbofan engine 100 with a thrust reverser assembly of a type known in the art. The engine 100 is schematically represented as including a nacelle 112 and a core engine 114. A fan assembly 116 located in front of the core engine 114 includes an array of fan blades 118. As discussed above with respect to the engine 20, a large portion of the air that enters the fan assembly 116 is bypassed to the rear of the engine 100 to generate additional engine thrust. The bypassed air passes through an annular-shaped bypass duct 130 between the nacelle 112 and an inner core cowl 136, and exits the duct 130 through a fan exit nozzle 132. The core cowl 136 defines the radially inward boundary of the bypass duct 130, and provides an aft core cowl transition surface to a primary exhaust nozzle 138 that extends aftward from the core engine 114. The nacelle 112 defines the radially outward boundary of the bypass duct 130, and the bypassed fan air flows between bypass duct flow surfaces defined by the nacelle 112 and core cowl 136 before being exhausted through the fan exit nozzle 132.

The nacelle 112 is typically composed of three primary elements that define the external boundaries of the nacelle 112: an inlet assembly 112A, a fan cowl 112B interfacing with an engine fan case that surrounds the fan blades 118, and a thrust reverser assembly 112C located aft of the fan cowl 112B. The thrust reverser assembly 112C comprises three primary components: a translating cowl 134A mounted to the nacelle 112, a cascade 134B schematically represented within the nacelle 112, and blocker doors 134C adapted to be pivotally deployed from stowed positions shown in FIG. 2 radially inward from the cascade 134B. The inner core cowl 136 of the core engine 114 is also part of the thrust reverser assembly 112C, and the fore end of each blocker door 134C is pivoted into engagement with the inner core cowl 136 when the door 134C is fully deployed. The cascade 134B is a fixed structure of the nacelle 112, whereas the translating cowl 134A is adapted to be translated aft to expose the cascade 134B and deploy the blocker doors 134C into the duct 130 using a link arm 134D, causing bypassed air within the duct 130 to be diverted through the exposed cascade 134B and thereby provide a thrust reversal effect. While two blocker doors 134C are shown in FIG. 2, a plurality of blocker doors 134C are typically circumferentially spaced around the circumference of the nacelle 112.

In a conventional thrust reverser design used in the high bypass turbofan engine 100, the cascade 134B is covered by the translating cowl 134A. The stowed blocker doors 134C form part of the duct flow path when the thrust reverser assembly 112C is not in use, that is, during normal in-flight operation of the engine 100. A drawback of this type of conventional construction is that the blocker doors 134C define portions of the fan duct outer flow surfaces, and surface interruptions (gaps and steps) and duct leakage resulting from the doors 134C can increase aerodynamic drag and reduce aerodynamic performance. The link arms 134D associated with the blocker doors 134C protrude into the fan duct 130 flow path to further increase aerodynamic drag and other flow perturbation that can cause aerodynamic or acoustic inefficiencies. In addition, the blocker doors 134C incorporate only limited areas of acoustic treatment as well as create discontinuities in the translating cowl acoustic treatment, and are exposed to damage and wear-inducing conditions during normal engine operation. These aspects of conventional thrust reversers can significantly reduce engine performance, engine noise attenuation, specific fuel consumption, and operational reliability.

FIGS. 3-6 represent views of a region of a gas turbine engine containing an embodiment of a thrust reverser assembly 212C located within the nacelle 212 of a gas turbine engine 200 and aft of the fan cowl 212B. A core cowl 236 defines the radially inward boundary of a bypass duct 230, the nacelle 212 defines the radially outward boundary of the bypass duct 230, and bypassed air of the engine 200 passes through the bypass duct 230 and exits through a fan exit nozzle 232.

Figure 3:
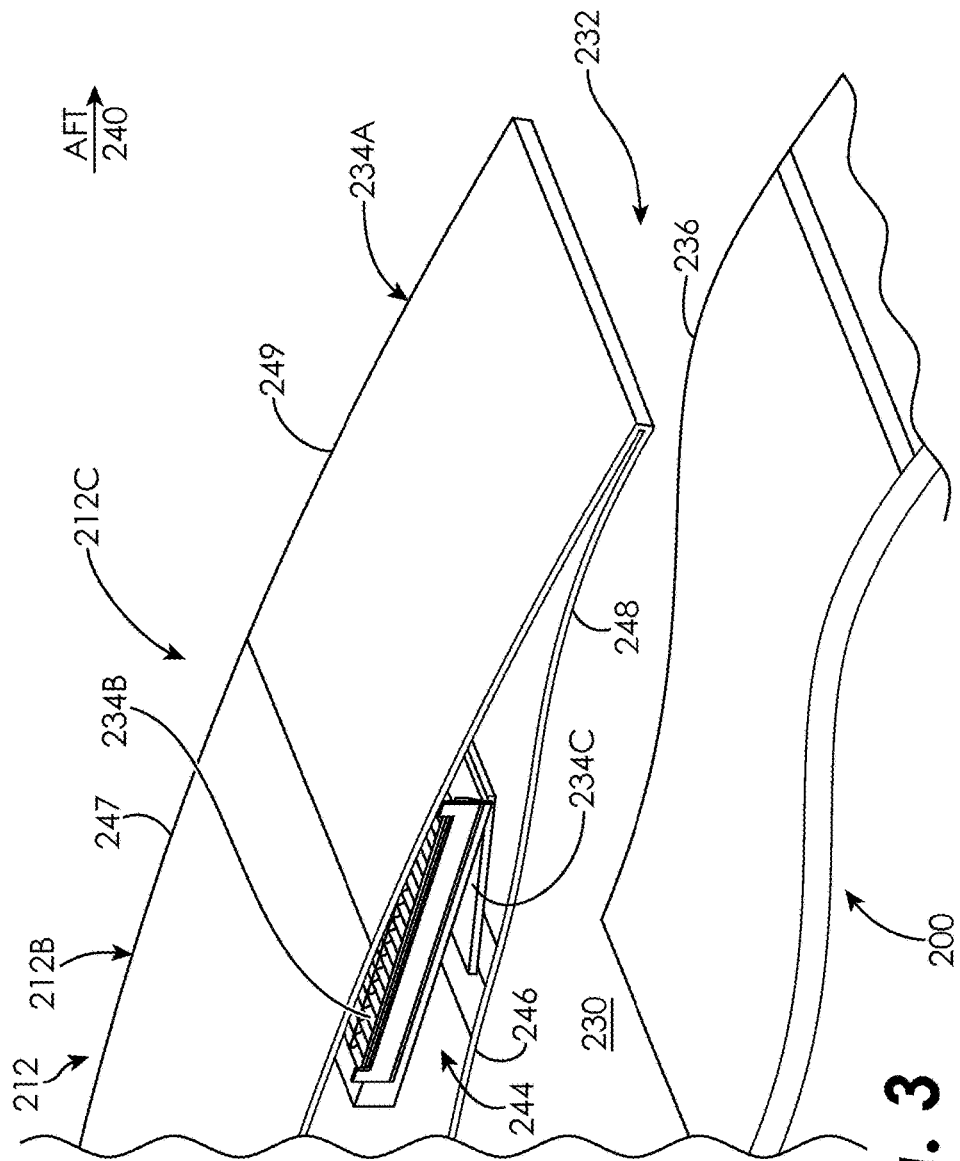
FIG. 3 is a schematic perspective view of a gas turbine engine with thrust reverser in an embodiment.
Figure 4:
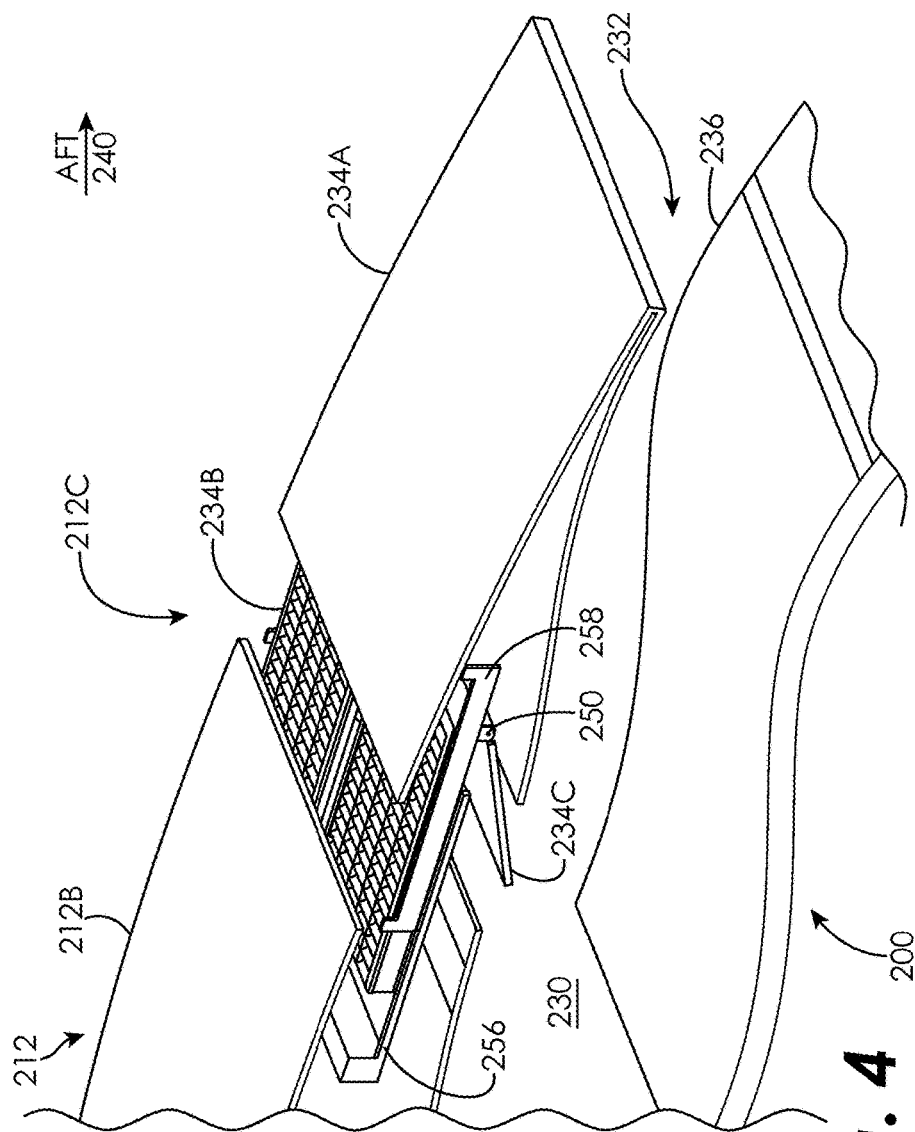
FIG. 4 is a schematic perspective view of a gas turbine engine with thrust reverser in an embodiment.

The thrust reverser assembly 212C comprises three primary components: a translating cowl 234A forms part of the nacelle 212, a translating cascade 234B within the nacelle 212, and blocker doors 234C. One of the blocker doors 234C is visible in FIGS. 3-5 and two of the blocker doors 234C are visible in FIG. 6, but a plurality of blocker doors 234C are circumferentially spaced around the circumference of the nacelle 212. As evident from FIGS. 3-6, the blocker door 234C is adapted to deploy from a stowed position radially inward of the translating cascade 234B, as shown in FIG. 3, through a partially deployed position shown in FIGS. 4-5, to a fully deployed position shown in FIG. 6. Both the translating cascade 234B and the translating cowl 234A move during the operation of the thrust reverser assembly 212C. The translating cowl 234A is adapted to be translated in the aft direction 240 of the engine 200 to expose the translating cascade 234B and deploy the blocker door 234C into the duct 230. During a portion of this process, the translating cascade 234B is also translated in the aft direction 240. For this purpose, the translating cowl 234A is coupled to one or more actuators 242 mounted to the nacelle 212. The one or more actuators 242 can be of any suitable type, such as a mechanical actuator operated by electric, pneumatic, hydraulic or electrohydraulic potential, to name just a few non-limiting examples.

Translation of the translating cowl 234A in the aft direction 240 causes the blocker door 234C to be deployed into the bypass duct 230 in a manner represented in FIGS. 3-6. When fully deployed, the blocker door 234C may extend across the entire or substantially the entire radial width of the duct 230 and causes bypassed air within the duct 230 to be diverted through the exposed translating cascade 234B and thereby provide a thrust reversal effect. Prior to translation of the translating cowl 234A, and therefore while the thrust reverser assembly 212C is not in use, the stowed blocker door 234C is positioned radially inward of the translating cascade 234B and both the translating cascade 234B and blocker door 234C are completely concealed by the translating cowl 234A. More particularly, the translating cascade 234B and blocker door 234C are contained within a cavity 244 defined between radially inner and outer walls 246 and 247 of the fan cowl 212B and between radially inner and outer walls 248 and 249 of the translating cowl 234A, such that the radially inner walls 246 and 248 completely separates the translating cascade 234B and blocker door 234C from the bypass duct 230. As such, the inner walls 246 and 248 define a portion of the radially outer flow surface of the bypass duct 230. Therefore, the blocker door 234C does not define any portion of the radially outer flow surface of the bypass duct 230 during normal engine operation, and therefore does not create surface interruptions (gaps and steps) or cause duct leakage that would increase aerodynamic drag and reduce aerodynamic performance of the engine 200. Furthermore, the blocker door 234C is not exposed to damage and wear-inducing conditions during normal in-flight engine operations. Another advantage is that the entire inner wall 246 of the fan cowl 212B and the entire inner wall 248 of the translating cowl 234A can incorporate an uninterrupted acoustic treatment (not shown) of its entire surface area to promote increased engine noise attenuation.

The blocker door 234C is coupled to the translating cascade 234B, as well as to the translating cowl 234A, as illustrated. The connection between the blocker door 234C and translating cascade 234B is shown as a pivoting connection, and in the embodiment of FIGS. 3-6 this pivoting connection is created by one or more pivot assemblies 250. As such, the blocker door 234C does not move in the fore and aft directions relative to the translating cascade 234B, but may pivot with respect to the translating cascade 234B during at least some of the range of translation of the translating cowl 234A. The connection between the blocker door 234C and inner wall 248 of the translating cowl 234A is shown as a sliding and pivoting connection, and in the embodiment of FIGS. 3-6 this sliding and pivoting connection is created by one or more slider assemblies 252. The slider assembly 252 is mounted to the inner wall 248 of the translating cowl 234A, and one end of the slider assembly 252 is disposed within a slider track 254 formed into the radially inner (when in the stowed position) surface of the blocker door 234C. The slider assembly 252 slides within the slider track 254 during fore and aft relative movement between the blocker door 234C and the translating cowl 234A. The portion of the slider assembly 252 disposed within the slider track 254 may also pivot with respect to the portion of the slider assembly 252 mounted to the inner wall 248 of the translating cowl 234A.

In the embodiment illustrated in FIGS. 3-6, the translating cascade 234B and the blocker door 234C are carried within a sliding frame assembly comprising a fixed frame 256 and a translating frame 258. The fixed frame 256 is mounted to the fan case and the translating frame 258 is mounted to the translating cowl 234A. The translating frame 258 may move in the fore and aft direction with respect to the fixed frame 256 during translation of the translating cowl in the fore and aft direction. In some embodiments, means are provided to limit the range of motion of the translating cascade 234B, such as a feature (not shown) on the translating cascade 234B that abuts a stop (not shown) on the fixed frame 256 at a predetermined point in the translation of the translating cascade 234B in the aft direction. This prevents further aft movement of the translating cascade 234B while the sliding frame 258 continues to move in the aft direction.

From the deployment sequence illustrated in FIGS. 3-6, as the translating cowl 234A is translated in the aft direction 240 by the actuator 242 to deploy the thrust reverser assembly 212C, the translating frame 258 is pulled in the aft direction 240. Because of the attachment of the translating cowl 234A through the slider assembly 252, slider track 254, and pivot assembly 250, both the translating cascade 234B and the attached blocker door 234C are also pulled in the aft direction 240. At a predetermined point in the translation after the blocker door 234C is moved completely aft of the inner wall 246, the feature (not shown) on the translating cascade 234B abuts the stop (not shown) on the fixed frame 256. Because of this, further aft movement of the translating cascade 234B and blocker door 234C is prevented, while the sliding frame 258 continues to move in the aft direction.

As the translating cowl 234A continues to move in the aft direction 240, the blocker door 234C remains stationary and the slider assembly 252 slides within the slider track 254 on the blocker door 234C, causing the blocker door 234C to be pivoted into the bypass duct 230 toward the core cowl 236. At the full extension of the translating cowl 234A in the aft direction 240 as shown in FIG. 6, the blocker door 234C has been lowered to its full operational position.

When it is desired to return the thrust reverser assembly 212C to the stowed position of FIG. 3, the actuator 242 is retracted to pull the translating cowl 234A in the forward direction. This causes the sliding frame 258 to move forward relative to the fixed frame 256. During this motion, the translating cascade 234B remains temporarily stationary. The slider assembly 252 slides within the slider track 254, thereby pivoting the blocker door 234C toward the translating cascade 234B. The blocker door 234C is pivoted to a position where it is radially outward of the radial position of the inner wall 246 of the fan cowl 212B such that these two structures will not interfere with one another. Further retraction of the actuators 242 in the forward direction causes the frame 258 to engage the aft surface of the translating cascade 234B, thereby causing the translating cascade 234B and the attached blocker door 234C to begin moving in the forward direction. Once the translating cowl 234A has been fully retracted to be in close proximity to the fan cowl 212B, the translating cascade 234B and blocker door 234C are in their stowed position shown in FIG. 3.

The pivoting and sliding joints of the blocker door 234C are preferably geometrically and physically designed to provide a desired sequence and rate of deployment for the blocker door 234C. In the deployed position, multiple blocker doors 234C can be configured to interface together to yield a desired percentage of duct 230 blockage and to match the exit area desirable to fan 118 performance during translation.

The operation described above in reference to FIGS. 3-6 can be adjusted or modified by equipping the frame assembly with adjustable end stops (not shown) to enable adjustment of the travel limits and provide for energy absorption. In addition, the stops could be configured to provide a system pre-load in the stowed and deployed positions to reduce wear.

In addition, the slider track 254 of the blocker door 234C and/or the slider assembly 252 of the translating cowl 234A may include adjustable bump stop features to provide travel limitation/adjustment, load absorption, and load transfer capabilities. It may also be desirable to include a telescopic link or spring-loaded cable attachment between each blocker door 234C and the forward fixed structure of the thrust reverser assembly 212C to provide additional door rotation restraint, energy absorption or load transfer.

From the above discussion and the depiction in FIGS. 3-6, it should be appreciated that the operation of the blocker doors 234C and their sliding and pivoting connections are not dependent on any particular type of cascade design. Rather, the disclosed embodiments could be installed in a non-cascade reverser design in which the bypassed air is diverted from the bypass duct 230 through openings of various configurations. Furthermore, whereas the blocker door 234C represented in FIGS. 3-6 has a rigid construction that does not intentionally bend, flex or fold during its deployment, blocker doors having any of these capabilities are also within the scope of the present disclosure.

It should be further understood that an extended length blocker door, or folding door that extends as it is deployed, may be deployed into the external air flow to provide additional retarding drag. Finally, it should be appreciated that the thrust reverser assembly 212C and its individual components can be constructed of various materials, including metallic, plastic and composite materials commonly used in aerospace applications. Such components may be fabricated by machining, casting, molding, lamination, etc., and combinations thereof.

While the presently disclosed embodiments have been illustrated and described in detail in the drawings and foregoing description, the same is to be considered as illustrative and not restrictive in character, it being understood that only certain embodiments have been shown and described and that all changes and modifications that come within the scope of the disclosure are desired to be protected.

What is claimed:

1. A thrust reverser assembly for a gas turbine engine having a core engine, the thrust reverser assembly comprising:
    a nacelle surrounding the core engine and defining a bypass duct between the nacelle and the core engine, the nacelle comprising a translating cowl adapted to translate in an aft direction;
    a slider assembly operatively coupled to the translating cowl;
    a translating structure within the nacelle and/or the translating cowl and adapted to translate in the aft direction, the translating structure comprising a translating cascade and at least one opening that is exposed to the bypass duct when the translating cowl is translated in the aft direction; and
    a blocker door pivotally coupled to the translating cascade by one or more pivot assemblies such that the blocker door does not move in the fore and aft directions relative to the translating cascade, but is arranged to pivot with respect to the translating cascade during at least some of the range of translation of the translating cascade, the blocker door comprising a slider track engaging the slider assembly, wherein the slider track is formed within a radially inner surface of the blocker door and wherein the blocker door and the translating cascade translate in the aft direction when the translating cowl is translated in the aft direction.

2. The thrust reverser assembly of claim 1, wherein the translating cowl comprises a radially inner wall that defines a radially outer flow surface of the bypass duct.

3. The thrust reverser assembly of claim 1, further comprising:
    an actuator operatively coupled to the nacelle and to the translating cowl;
    wherein the actuator is adapted to translate the translating cowl in the aft direction.

4. The thrust reverser assembly of claim 2, wherein:
    the slider assembly is adapted to slide in the slider track in the aft direction as the translating cowl moves in the aft direction, and interaction between the slider assembly and the slider track causes the blocker door to move from a stowed position to a deployed position by pivoting relative to the translating structure;
    the inner wall of the translating cowl is between the blocker door and the bypass duct when the blocker door is in the stowed position; and
    the blocker door projects into the bypass duct and diverts bypass air within the bypass duct through the at least one opening of the translating structure when the blocker door is in the deployed position.

5. The thrust reverser assembly of claim 3, wherein:
    the translating cowl is adapted to translate a first distance in the aft direction;
    the actuator is adapted to translate the first distance in the aft direction;
    the translating structure is adapted to translate a second distance in the aft direction; and
    the first distance is greater than the second distance.

6. The thrust reverser assembly of claim 1, wherein a portion of the slider assembly is captive within the slider track.

7. The thrust reverser assembly of claim 1, wherein the slider assembly pivots with respect to the translating cowl.

8. The thrust reverser assembly of claim 1, further comprising: a fixed frame coupled to the nacelle; a sliding frame coupled to the translating cowl and adapted to slide relative to the fixed frame; wherein the translating cascade and blocker door are disposed in sliding engagement with the fixed frame and the sliding frame; wherein aft movement of the translating cowl causes aft movement of the translating cascade and the blocker door, without movement of the slider assembly relative to the slider track, until the translating cascade reaches a predetermined point; and wherein aft movement of the translating cowl after the translating cascade reaches the predetermined point causes movement of the slider assembly relative to the slider track.

9. The thrust reverser assembly of claim 3, wherein the actuator comprises a mechanical actuator.

10. A high-bypass gas turbofan engine having a core engine and a thrust reverser assembly, the thrust reverser assembly comprising:
    a nacelle surrounding the core engine and defining a bypass duct between the nacelle and the core engine, the nacelle comprising a translating cowl adapted to translate in an aft direction;
    a slider assembly operatively coupled to the translating cowl;
    a translating structure within the nacelle and/or the translating cowl and adapted to translate in the aft direction, the translating structure comprising a translating cascade and at least one opening that is exposed to the bypass duct when the translating cowl is translated in the aft direction; and a blocker door pivotally coupled to the translating cascade by one or more pivot assemblies such that the blocker door does not move in the fore and aft directions relative to the translating cascade, but is arranged to pivot with respect to the translating cascade during at least some of the range of translation of the translating cascade, the blocker door comprising a slider track engaging the slider assembly, wherein the slider track is formed within a radially inner surface of the blocker door and wherein the translating cascade and the blocker door translate in the aft direction when the translating cowl is translated in the aft direction.

11. The high-bypass gas turbofan engine of claim 10, wherein the translating cowl comprises a radially inner wall that defines a radially outer flow surface of the bypass duct.

12. The high-bypass gas turbofan engine of claim 10, further comprising:
an actuator operatively coupled to the nacelle and to the translating cowl;
wherein the actuator is adapted to translate the translating cowl in the aft direction.

13. The high-bypass gas turbofan engine of claim 11, wherein:
the slider assembly is adapted to slide in the slider track in the aft direction as the translating cowl moves in the aft direction, and interaction between the slider assembly and the slider track causes the blocker door to move from a stowed position to a deployed position by pivoting relative to the translating structure;
the inner wall of the translating cowl is between the blocker door and the bypass duct when the blocker door is in the stowed position; and
the blocker door projects into the bypass duct and diverts bypass air within the bypass duct through the at least one opening of the translating structure when the blocker door is in the deployed position.

14. The high-bypass gas turbofan engine of claim 12, wherein: the translating cowl is adapted to translate a first distance in the aft direction; the actuator is adapted to translate the first distance in the aft direction; the translating structure is adapted to translate a second distance in the aft direction; and the first distance is greater than the second distance.

15. The high-bypass gas turbofan engine of claim 10, wherein a portion of the slider assembly is captive within the slider track.

16. The high-bypass gas turbofan engine of claim 10, wherein the slider assembly pivots with respect to the translating cowl.

17. The high-bypass gas turbofan engine of claim 10, further comprising: a fixed frame coupled to the nacelle; a sliding frame coupled to the translating cowl and adapted to slide relative to the fixed frame; wherein the translating cascade and blocker door are disposed in sliding engagement with the fixed frame and the sliding frame; wherein aft movement of the translating cowl causes aft movement of the translating cascade and the blocker door, without movement of the slider assembly relative to the slider track, until the translating cascade reaches a predetermined point; and wherein aft movement of the translating cowl after the translating cascade reaches the predetermined point causes movement of the slider assembly relative to the slider track.

18. The high-bypass gas turbofan engine of claim 12, wherein the actuator comprises a mechanical actuator.

19. A method of reversing thrust of a gas turbine engine having a core engine, a nacelle surrounding the core engine, the nacelle comprising a translating cowl adapted to translate in an aft direction, a bypass duct defined by and between the nacelle and the core engine, the method comprising:
translating the translating cowl in the aft direction;
translating a translating structure and a translating cascade of the translating structure in the aft direction;
exposing the translating structure and at least one opening thereof to the bypass duct as the translating cowl and the translating structure are translated in the aft direction; and
deploying a blocker door from a stowed position to a deployed position as the translating cowl is translated in the aft direction, the blocker door being pivotally coupled to the translating cascade by one or more pivot assemblies such that the blocker door does not move in the fore and aft directions relative to the translating cascade, but is arranged to pivot with respect to the translating cascade during at least some of the range of translation of the translating cascade, the blocker door including a slider track coupled to the translating cowl, wherein the slider track is formed within a radially inner surface of the blocker door, the blocker door being deployed as a result of interaction between the translating cowl and the slider track;
wherein the deploying step causes the blocker door to translate in the aft direction and project into the bypass duct and divert bypass air within the bypass duct through the at least one opening.

20. The method of claim 19, wherein the translating cowl is translated in the aft direction a first distance, the translating structure is translated in the aft direction a second distance, and the first distance is greater than the second distance.

* * * * *